(12) United States Patent
Soares et al.

(10) Patent No.: US 10,090,933 B2
(45) Date of Patent: Oct. 2, 2018

(54) POLARIZATION INSENSITIVE SELF-HOMODYNE DETECTION RECEIVER

(71) Applicant: NATIONAL INSTITUTE OF INFORMATION AND COMMUNICATIONS TECHNOLOGY, Koganei-shi, Tokyo (JP)

(72) Inventors: Luis Ruben Soares, Koganei (JP); Ben Puttnam, Koganei (JP); Mendinueta Jose Manuel Delgado, Koganei (JP); Yoshinari Awaji, Koganei (JP); Naoya Wada, Koganei (JP)

(73) Assignee: NATIONAL INSTITUTE OF INFORMATION AND COMMUNICATIONS TECHNOLOGY, Tokyo (JP)

(*) Notice: Subject to any disclaimer, the term of this patent is extended or adjusted under 35 U.S.C. 154(b) by 0 days.

(21) Appl. No.: 15/565,416

(22) PCT Filed: Apr. 10, 2015

(86) PCT No.: PCT/JP2015/002027
§ 371 (c)(1),
(2) Date: Oct. 9, 2017

(87) PCT Pub. No.: WO2016/162903
PCT Pub. Date: Oct. 13, 2016

(65) Prior Publication Data
US 2018/0123702 A1 May 3, 2018

(51) Int. Cl.
*H04B 10/06* (2006.01)
*H04B 10/63* (2013.01)
(Continued)

(52) U.S. Cl.
CPC .......... *H04B 10/63* (2013.01); *H04B 10/614* (2013.01); *H04B 10/6151* (2013.01); *H04B 10/676* (2013.01)

(58) Field of Classification Search
CPC .. H04B 10/63; H04B 10/6151; H04B 10/676; H04B 10/614
(Continued)

(56) References Cited

U.S. PATENT DOCUMENTS 7,421,210 B2    9/2008   Miyazaki
8,014,686 B2 *  9/2011   Rahn ................... H04B 10/697
                                                    398/205
(Continued)

FOREIGN PATENT DOCUMENTS

WO      WO0227994 A1      4/2002

OTHER PUBLICATIONS

International Search Report of International Application No. PCT/JP2015/002027 completed May 14, 2015 and dated May 26, 2015 (2 pages).
(Continued)

*Primary Examiner* — M. R. Sedighian
(74) *Attorney, Agent, or Firm* — Pyprus Pte Ltd

(57) ABSTRACT

The receiver 11 for self-homodyne detection comprises a coherent detection system and a direct detection system. The receiver comprises a polarization splitter 13, a first splitter 15, a 90 degree polarization rotor 17, a hybrid detector 19, a first balanced detector 21, and a processor 23.

5 Claims, 2 Drawing Sheets

(51) Int. Cl.
*H04B 10/61* (2013.01)
*H04B 10/67* (2013.01)

(58) Field of Classification Search
USPC .................................................. 398/203, 205
See application file for complete search history.

(56) References Cited

U.S. PATENT DOCUMENTS

| | | | | |
|---|---|---|---|---|
| 8,311,417 | B1* | 11/2012 | Poggiolini | H04B 10/611 |
| | | | | 398/147 |
| 9,407,376 | B2* | 8/2016 | Lyubomirsky | H04J 14/06 |
| 2007/0025737 | A1 | 2/2007 | Kamio et al. | |
| 2009/0214224 | A1 | 8/2009 | Cho et al. | |
| 2010/0054761 | A1* | 3/2010 | Chen | H04B 10/60 |
| | | | | 398/212 |
| 2014/0270769 | A1 | 9/2014 | Nazarathy et al. | |

OTHER PUBLICATIONS

Written Opinion of International Application No. PCT/JP2015/002027 completed May 14, 2015 (4 pages).

Benjamin J. Puttnam et al, Self-Homodyne Detection in Optical Communication Systems, Photonics, May 6, 2014, Photonics 2014 1(2), pp. 110-130 (Retrieval date May 13, 2015), Internet<URL:http://www.mdpi.com/2304-6732/1/2/110/pdf>.

Ruben S. Luis et al., Demonstration of Wavelength-Shared Coherent PON Using RSOA and Simplified DSP, IEEE Photonics Technology Letters, vol. 26, No. 21, IEEE, Nov. 1, 2014, pp. 2142-2145.

Pontus Johannisson et al., Cancellation of Nonlinear Phase Distortion in Self-Homodyne Coherent Systems, IEEE Photonics Technology Letters, Jun. 1, 2010, vol. 22, No. 11, pp. 802-804.

T Miyazaki, et al., PSK self-homodyne detection using a pilot carrier for multibit/symbol transmission with inverse-RZ signal, Jun. 6, 2005.

R. Luis, et al., Digital self-homodyne detection, IEEE Photonics Technology Letters, vol. 27, No. 6, Mar. 15, 2015.

R. Luis, et al., Ultra high capacity self-homodyne PON with simplified OUN and burst-mode upstream, Apr. 7, 2014.

* cited by examiner

[Fig. 1]
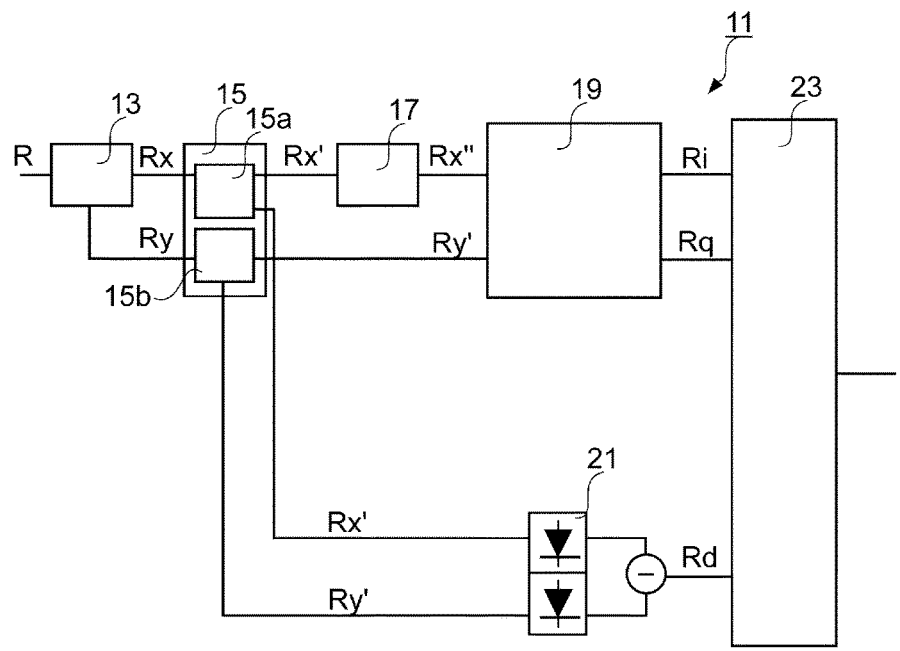
[Fig. 2]
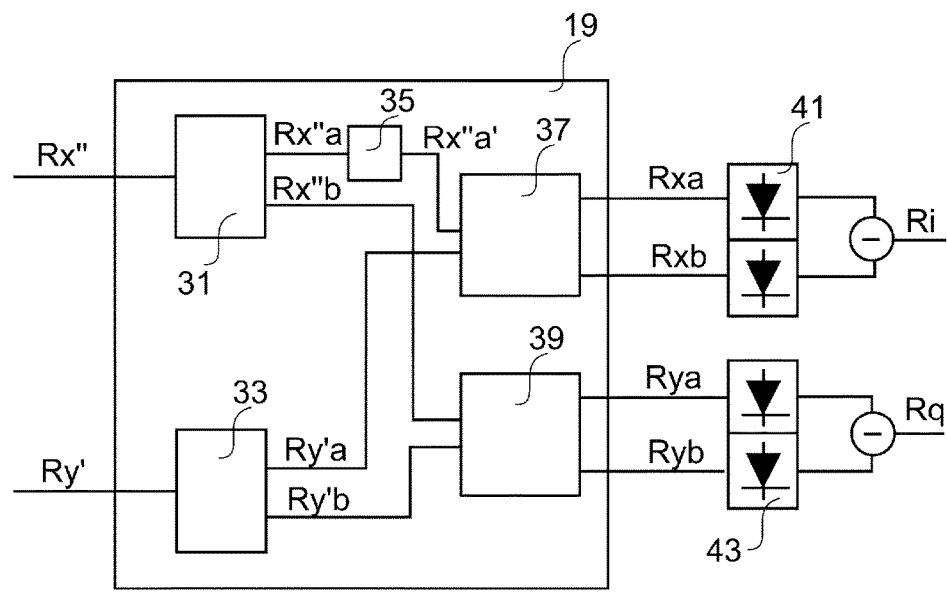

[Fig. 3]
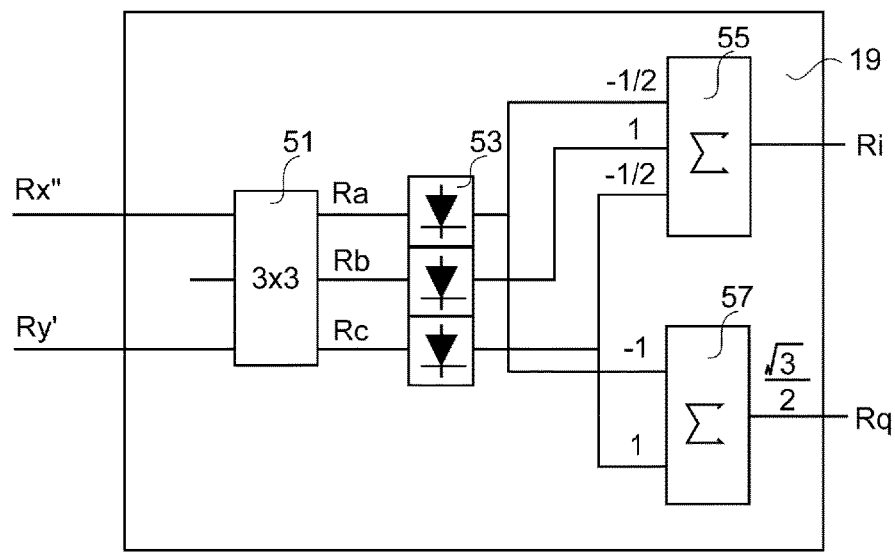
[Fig. 4]
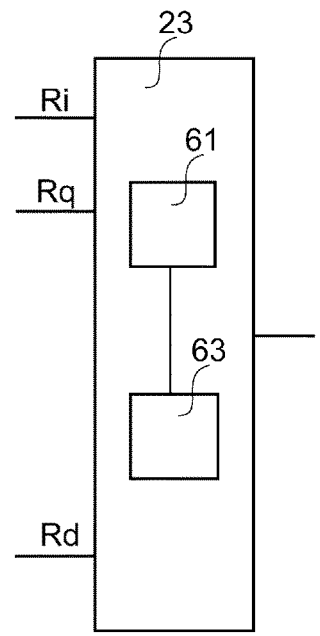

POLARIZATION INSENSITIVE SELF-HOMODYNE DETECTION RECEIVER

TECHNICAL FIELD

The present invention relates to a receiver for Coherent self-homodyne detection (SHD) and more particularly to polarization insensitive SHD receiver.

BACKGROUND ART

Coherent self-homodyne detection (SHD) was originally proposed in the following Non-Patent Literature 1 [T. Miyazaki and F. Kubota, "PSK self-homodyne detection using a pilot carrier for multibit/symbol transmission with inverse-RZ signal, Photonics Technology Letters, Vol. 17, No. 6, June 2005] and consists in sharing the light from a light source into two orthogonal polarization components. One of these components is modulated with a coherent information signal whereas the other remains unmodulated. Both components are then polarization multiplexed and transmitted through an optical fiber. It has been demonstrated that both components remain phase coherent, event after long transmission distances (Non-Patent Literature 2 [R. Luis, et al., "Digital self-homodyne detection", submitted to Photonics Technology Letters, November 2014]). At the receiver, a polarization beam splitter separates both components again, sending them to a coherent receiver. There, the polarization of the modulated component is aligned to the polarization axis of the unmodulated component or vice-versa and both components are mixed. The resulting interference signal is converted to the electrical domain by photo-detectors. Since both components are phase coherent, the electrical signal is only modestly affected by phase noise from the transmission light source. Therefore, low-cost wide-linewidth light sources can be used. These receivers are homodyne and therefore, do not require carrier frequency offset estimation or compensation. In addition, they do not require the use of a potentially costly laser to be used as local oscillator at the receiver. For this reason, they have been recently proposed for use in cost-sensitive applications, such as passive optical networks (Non-Patent Literature 3 [R. Luis, et al., "Ultra high capacity self-homodyne PON with simplified ONU and burst-mode upstream", Photonics Technology Letters, Vol 26, No. 7, April 2014]).

CITATION LIST

Patent Literature

[PTL1] U.S. Pat. No. 7,421,210
[PTL2] US20090214224
[PTL3] WO2002/027994

Non Patent Literature

[NPL1] T. Miyazaki and F. Kubota, "PSK self-homodyne detection using a pilot carrier for multibit/symbol transmission with inverse-RZ signal, Photonics Technology Letters, Vol. 17, No. 6, June 2005
[NPL2] R. Luis, et al., "Digital self-homodyne detection", submitted to Photonics Technology Letters, November 2014
[NPL3] R. Luis, et al., "Ultra high capacity self-homodyne PON with simplified ONU and burst-mode upstream", Photonics Technology Letters, Vol 26, No. 7, April 2014

SUMMARY OF INVENTION

Technical Problem

For appropriate reconstruction of the information signal, the receiver is required to separate the original modulated and unmodulated components of the signal. For this purpose, an optical polarization control sub-system is required at the input of the receiver, as shown in the prior art, to align the incoming signal to the polarization axis of the polarization beam splitter. This polarization control must be performed using mechanical or electro-optical components and requires a complex feedback sub-system, which may increase substantially the cost and complexity of the receiver.

To address the aforementioned limitations of the prior art, this invention regards an embodiment of a receiver that is capable of reconstructing the original information system without the need for polarization alignment sub-systems and associate feed-back mechanisms. The proposed receiver makes use of a specialized detection system, which combines coherent and direct detection sub-systems. In addition, electrical or digital signal processing is used after detection, to reconstruct the initial information signal. The signal processing involves applying the inverse of the Jones matrix of the transmission channel to the detected signal. In addition, this invention includes an embodiment of a method to compute the Jones matrix of the transmission channel, thus providing the information required for the signal processor to reconstruct the original signal.

Solution to Problem

This invention regards a receiver that separates the incoming signal in two orthogonal components using a polarization beam splitter. It is assumed that the polarization state of the incoming signal is unknown and misaligned with respect to the polarization beam splitter. As such, each of the separated components will contain a fraction of the original modulated component as well as a fraction of the original unmodulated component. The ratios and relative phases between these components depend on the Jones matrix of the transmission fiber and are assumed to vary randomly at a rate much lower than the data rate of the information signal.

The separated orthogonal components are then shared among two sub-receivers. One is a coherent receiver, which mixes both components and converts the resulting interference signal to the electrical domain. The other is a direct detection receiver equipped with balanced photodetectors, which generates an electrical signal corresponding to the difference between the instantaneous powers of both components.

The reconstructed signal is obtained through a linear combination of the interference signal and the directly detected signal with complex coefficients computed using a channel estimation sub-system. The channel estimation sub-system computes the polarization azimuth and elevation angles of the Jones matrix of the transmission fiber using the ratio between the average levels of the intereference signal and the directly detected signal.

Advantageous Effect of Invention

The present invention provides a receiver that is capable of reconstructing the original information system without the need for polarization alignment sub-systems and associate feed-back mechanisms.

BRIEF DESCRIPTION OF DRAWINGS

FIG. 1 depicts a block diagram of the receiver for SHD.
FIG. 2 depicts one example of the hybrid detector.
FIG. 3 depicts another example of the hybrid detector.
FIG. 4 depicts a block diagram of the processor.

DESCRIPTION OF EMBODIMENTS

FIG. 1 depicts a Block diagram of the receiver for SHD of the present invention. The receiver 11 comprises a coherent detection system and a direct detection system. As shown in FIG. 1, the receiver comprises a polarization splitter 13, a first splitter 15, a 90 degree polarization rotor 17, a hybrid detector 19, a first balanced detector 21, and a processor 23.

The polarization splitter 13 splits an incoming signal R in two orthogonal components. A polarization beam splitter (PBS), may act as the polarization splitter 13. The two orthogonal components comprise a first component Rx and a second component Ry. The polarization axis of the first component Rx is perpendicular to that of the second component Ry.

The first splitter 15 separates the first component Rx into two separated first components Rx' and the second component Ry into two separated second components Ry'. Two splitters or two separators may act as the first splitter 15. Such a splitter may split incident light into two lights that have half power of the incident light. In the FIG. 1, the first separator 15a separates the first component Rx into two separated first components Rx'. The second separator 15b separates the second component Ry into two separated second components Ry'.

The 90 degree polarization rotor 17 rotates polarization of one of the separated first component Rx' by 90 degrees to obtain a polarization controlled separated first component Rx". Such a 90 degree polarization rotor is well known in the art as disclosed in the above PTL1 and 2.

The hybrid detector 19 couples the polarization controlled separated first component Rx" and the separated second component Ry', and outputs a first electrical signal Ri and a second electrical signal Rq. The first electrical signal Ri is an in-phase mix between the components Rx" and Ry' and the second electrical signal Rq is an in-quadrature mix between the components Rx" and Ry'. The hybrid detector is well known in the art and there are various types of hybrid detectors. It is possible to implement various types of hybrid detectors. FIGS. 2 and 3, explained later, are examples of such hybrid detectors. The hybrid detector is well known device. For example, US 20090214224 and U.S. Pat. No. 7,421,210 disclose such hybrid detectors.

The first balanced detector 21 detects the other separated first components Rx' and the other separated second components Ry'. The first balanced detector 21 outputs a third electrical signal Rd. Rd is the difference of the instantaneous powers of Rx' and Ry'.

The processor 23 receives the first electrical signal Ri, the second electrical signal Rq and the third electrical signal Rd and reconstruct an original information signal Rs. (Rs is not shown in the FIG. 1) The original information signal Rs is the original information signal of the incoming signal R.

FIG. 2 depicts one example of the hybrid detector. As shown in FIG. 2, the hybrid detector 19 comprises a second splitter 31, a third splitter 33, a 90 degree phase shifter 35, a first 2×2 coupler 37, a second 2×2 coupler 39, a first set of two photodetectors 41 and a second set of two photodetectors 43.

The second splitter 31 divides Rx" into two components Rx"a and Rx"b. The component Rx" is output from the 90 degree polarization rotor 17 in FIG. 1 and is the polarization controlled separated first component, as explained above.

The third splitter 33 divides Ry' into two components Ry'a and Ry'b. The component Ry' is output from the second separator 15b and is one of the separated second components. Components Rx" a, Rx"b, Ry' a and Ry'b may have the same polarization The 90 degree phase shifter 35 shifts a phase of Rx"a by 90 degrees to obtain a phase shifted signal Rx"a'. The Rx"a is one of the output components of the second splitter 31.

The first 2×2 coupler 37 combines the signal Ry'a and the phase shifted signal Rx"a' to generate optical signals Rxa and Rxb. The signal Ry'a is an output signal of the third splitter 33 and the phase shifted signal Rx"a' is an output signal of the 90 degree phase shifter 35. The optical signals Rxa and Rxb are proportional to jRx"a'+jRy'a and −Rx"a'+Ry'a, respectively.

The second 2×2 coupler 39 combines the signal Rx"b and the signal Ry'b to generate optical signals Rya and Ryb. The signal Rx"b is an output signal of the second splitter 31 and the signal Ry'b is an output signal of the third splitter 33. The optical signals Rya and Ryb are proportional to jRx"b−Ryb and −Rx"b+jRyb, respectively.

The first set of two photodetectors 41 in a balanced configuration executes balanced detection. The two photodetectors 41 detect the electrical signals Rxa and Rxb and output the first electrical signal Ri. The first electrical signal Ri results from the difference between the instantaneous powers of the optical signals Rxa and Rxb and is proportional to the real part of Rx"×Ry'*. Ry'* is the complex of Ry'.

The second set of two photodetectors 43 in a balanced configuration executes balanced detection. The two photodetectors 43 detect the signals Rya and Ryb and output the second electrical signal Rq. The second electrical signal Rq results from the difference between the instantaneous powers of the optical signals Rya and Ryb and is proportional to the imaginary part of Rx"×Ry'*. Ry'* is the complex of Ry'.

FIG. 3 depicts another example of the hybrid detector. The hybrid detector 19 depicted in FIG. 3 is a 120 degree-hybrid system. As shown in the FIG. 3, the hybrid detector 19 comprises a symmetric 3×3 coupler 51, three photodetectors 53, which detect the signals Ra, Rb and Rc; a first electronic apparatus 55 and a second electronic apparatus 57.

The symmetric 3×3 coupler 51 has three inputs and three outputs. The signals Rx" and Ry' input into the symmetric 3×3 coupler 51 through two inputs. The remaining input may be left open. The output signals are Ra, Rb and Rc.

The first output signal Ra from the symmetric 3×3 coupler 51 is proportional to $(\frac{2}{3}\times\exp(2\text{ pi}/9)+\frac{1}{3}\times\exp(-4\text{ pi}/9))\times Rx"+(\frac{1}{3}\times\exp(-4\text{ pi}/9)-\frac{1}{3}\times\exp(2\text{ pi}/9))\times Ry'$. In this specification "pi" is the ratio of the circumference of a circle to its diameter.

The second output signal Rb from the symmetric 3×3 coupler 51 is proportional to: $(\frac{1}{3}\times\exp(-4\text{ pi}/9)-\frac{1}{3}\times\exp(2\text{ pi}/9))\times(Rx"+Ry')$.

The third output signal Rc from the symmetric 3×3 coupler 51 is proportional to: $(\frac{1}{3}\times\exp(-4\text{ pi}/9)-\frac{1}{3}\times\exp(2\text{ pi}/9))\times Rx"+(\frac{2}{3}\times\exp(2\text{ pi}/9)+\frac{1}{3}\times\exp(-4\text{ pi}/9))\times Ry'$.

The three photodetectors 53 detect the signals Ra, Rb and Rc. The signals Ra, Rb and Rc are optical signals output from the symmetric 3×3 coupler 51. The output signals of three photodetectors 53 are electric signals that reflect the instantaneous powers of the optical signals Ra, Rb and Rc. They are also denoted as Ra, Rb and Rc.

The first electronic apparatus 55 computes the sum of the signal Ra multiplied by −½, with the signal Rb and the signal Rc multiplied by −½. The output of the first electronic apparatus 55 is proportional to the real part of Rx"×Ry'*, which forms the signal Ri.

The second electronic apparatus 57 computes the sum of the signal Ra multiplied by −1 and the signal Rb. The output of the second electronic apparatus 57 is multiplied by √3/2 to be proportional to the imaginary part of Rx"×Ry'*, which forms the signal Rq.

The processor 23 comprises:

an average value calculator 61 that calculates the average values of the first electrical signal Ri, the second electrical signal Rq and the third electrical signal Rd and outputs an averaged first value <Ri>, an averaged first value <Rq> and an averaged first value <Rd>, respectively;

a coefficient calculator 63 that calculates following coefficients A1, A2 and A3 in a following equation (1) using the averaged first value <Ri>, the averaged first value <Rq> and the averaged first value <Rd>.

$$S = A1 \times Ri + A2 \times Rq + A3 \times Rd \quad (1).$$

(in the above equation (1), S is proportional to the original information signal, Rs.)

The coefficient calculator 63 may calculate:

a value F using the averaged first value <Ri>, the averaged first value <Rq> and the averaged first value <Rd>, F being <Rd>/(<Ri>+j<Rq>), a value d, d being −arg(F), a value q, q being "arctangent [2|F|]/2+k pi/2"

A1, A1 being "1−sin$^2$(q) (1+exp(−2jd))"

A2, A2 being "1−sin$^2$(q) (1−exp(−2jd))", and

A3, A3 being "exp(−2jd) sin(2q)/2".

The receiver for SHD of the present invention is used in coherent self-homodyne detection (SHD) system such as disclosed in WO02-27994. The system comprises a transmitter, a receiver and an optical fiber that connects the transmitter and the receiver. The transmitter separates the light from a light source into two orthogonal polarization components. One of these components is modulated with a coherent information signal whereas the other remains un-modulated. Both components are then polarization multiplexed and transmitted through the optical fiber. The receiver for SHD of the present invention receives the transmitted light R and reconstructs the original information signal Rs.

The polarization splitter 13 splits an incoming signal R in two orthogonal components. The polarization axis of the first component Rx is perpendicular to that of the second component Ry.

The first splitter 15 separates the first component Rx into two separated first components Rx' and the second component Ry into two separated second components Ry'. The 90 degree polarization rotor 17 rotates polarization of one of the separated first component Rx' by 90 degrees to obtain a polarization controlled separated first component Rx".

The hybrid detector 19 couples the polarization controlled separated first component Rx" and the separated second component Ry', and outputs a first electrical signal Ri and a second electrical signal Rq. The first balanced detector 21 detects the other separated first components Rx' and the other separated second components Ry'. The first balanced detector 21 outputs a third electrical signal Rd.

The first set of two photodetectors 41 in a balanced configuration executes balanced detection. The two photodetectors 41 detect the electrical signals Rxa and Rxb and output the first electrical signal Ri. The second set of two photodetectors 43 in a balanced configuration executes balanced detection. The two photodetectors 43 detect the signals Rya and Ryb and output the second electrical signal Rq.

The processor 23 receives the first electrical signal Ri, the second electrical signal Rq and the third electrical signal Rd and reconstruct an original information signal Rs. The original information signal Rs is the original signal of incoming signal R.

The processor 23 calculates the average values of the first electrical signal Ri, the second electrical signal Rq and the third electrical signal Rd and outputs an averaged first value <Ri>, an averaged first value <Rq> and an averaged first value <Rd>, respectively.

The processor 23 calculates following coefficients A1, A2 and A3 in a following equation (1) using the averaged first value <Ri>, the averaged first value <Rq> and the averaged first value <Rd>.

$$S = A1 \times Ri + A2 \times Rq + A3 \times Rd \quad (1).$$

(in the above equation (1), S is proportional to the original information signal, Rs.)

The processor 23 calculates a value F using the averaged first value <Ri>, the averaged first value <Rq> and the averaged first value <Rd>.

F is equal to <Rd>/(<Ri>+j<Rq>).

a value d, d is equal to −arg(F).

a value q, q is equal to "arctangent [2|F|]/2+(k×pi)/2"

A1, A1 is equal to "1−sin$^2$(q) (1+exp(−2jd))"

A2, A2 is equal to "1−sin$^2$(q) (1−exp(−2jd))", and

A3, A3 is equal to "exp(−2jd) sin(2q)/2".

The above calculations are executed in the processor 63.

The invention claimed is:

1. A receiver (11) for Coherent self-homodyne detection (SHD) which comprises:

a polarization splitter (13) that splits an incoming signal R in two orthogonal components, the two orthogonal components comprising a first component Rx and a second component Ry;

a first splitter (15) that separates the first component Rx into two separated first components Rx' and the second component Ry into two separated second components Ry';

a 90 degree polarization rotor (17) that rotates polarization of one of the separated first component Rx' by 90 degrees to obtain a polarization controlled separated first component Rx";

a hybrid detector (19) that couples the polarization controlled separated first component Rx" and the separated second component Ry', and outputs a first electrical signal Ri and a second electrical signal Rq, the first electrical signal Ri being an in-phase mix between the components Rx" and Ry', the second electrical signal Rq being an in-quadrature mix between the components Rx" and Ry';

a first balanced detector (21) that detects the other separated first components Rx' and the other separated second components Ry' and outputs a third electrical signal Rd; and a processor (23) that receives the first electrical signal Ri, the second electrical signal Rq and the third electrical signal Rd and reconstruct an original information signal Rs.

2. The receiver in accordance with claim 1, wherein the hybrid detector (19) comprises:

a second splitter (31), which divides Rx" into two components Rx"a and Rx"b;

a third splitter (33), which divides Ry' into two components Ry'a and Ry'b;

a 90 degree phase shifter (35), which shifts a phase of Rx"a by 90 degrees to obtain a phase shifted signal Rx"a';

a first 2×2 coupler (37), which combines the signal Ry'a and the phase shifted signal Rx"a' to generate optical signals Rxa and Rxb, which are proportional to jRx"a'+jRy'a and −Rx"a'+Ry'a, respectively;

a second 2×2 coupler (39), which combines the signal Rx"b and the signal Ry'b to generate optical signals Rya and Ryb, which are proportional to jRx"b−Ryb and −Rx"b+jRyb, respectively;

a first set of two photodetectors (41) in a balanced configuration, which detect the electrical signals Rxa and Rxb, the first set of two photodetectors (41) outputting the first electrical signal Ri, Ri resulting from the difference between the instantaneous powers of the optical signals Rxa and Rxb and being proportional to the real part of Rx"×Ry'*; and a second set of two photodetectors (43) in a balanced configuration, which detect the signals Rya and Ryb, the second set of two photodetectors (43) outputting the second electrical signal Rq, Rq resulting from the difference between the instantaneous powers of the optical signals Rya and Ryb and being proportional to the imaginary part of Rx"×Ry'*.

3. The receiver in accordance with claim 1,
wherein the hybrid detector (19) is a 120 degree-hybrid system which comprises:

a symmetric 3×3 coupler (51), which takes at two of its inputs the signals Rx" and Ry' and a remaining input is left open, signals at 3 outputs of the 3×3 coupler (51) being:

Ra, proportional to: (⅔×exp(2 pi/9)+⅓×exp(−4 pi/9))×Rx"+(⅓×exp(−4 pi/9)−⅓×exp(2 pi/9))×Ry';

Rb, proportional to: (⅓×exp(−4 pi/9)−⅓×exp(2 pi/9))×(Rx"+Ry'); and

Rc, proportional to: (⅓×exp(−4 pi/9)−⅓×exp(2 pi/9))×Rx"+(⅔×exp(2 pi/9)+⅓×exp(−4 pi/9))×Ry';

three photodetectors (53), which detect the signals Ra, Rb and Rc;

a first electronic apparatus (55) that computes the sum of the signal Ra multiplied by −½, with the signal Rb and the signal Rc multiplied by −½, an output of the first electronic apparatus (55) being proportional to the real part of Rx"×Ry'*, forming the signal Ri; and a second electronic apparatus (57) that computes the sum of the signal Ra multiplied by −1 and the signal Rb, an output of the second electronic apparatus (57) being multiplied by √3/2 to be proportional to the imaginary part of Rx"×Ry'*, forming the signal Rq.

4. The receiver in accordance with claim 1,
wherein the processor (23) comprises:

an average value calculator (61) that calculates the average values of the first electrical signal Ri, the second electrical signal Rq and the third electrical signal Rd and outputs an averaged first value <Ri>, an averaged first value <Rq> and an averaged first value <Rd>, respectively;

a coefficient calculator (63) that calculates following coefficients A1, A2 and A3 in a following equation (1) using the averaged first value <Ri>, the averaged first value <Rq>, and the averaged first value <Rd>, S=A1×Ri+A2×Rq+A3×Rd (1), wherein in the above equation (1), S is proportional to the original information signal Rs.

5. The receiver in accordance with claim 4,
wherein the coefficient calculator (63) calculates:

a value F using the averaged first value <Ri>, the averaged first value <Rq> and the averaged first value <Rd>, F being <Rd>/(<Ri>+j<Rq>), a value d, d being −arg(F), a value q, q being "arctangent [2|F|]/2+k×pi/2"

A1, A1 being "$1-\sin^2(q)(1+\exp(-2jd))$"

A2, A2 being "$1-\sin^2(q)(1-\exp(-2jd))$", and

A3, A3 being "$\exp(-2jd)\sin(2q)/2$".

* * * * *